(12) United States Patent
Drinovsky (10) Patent No.: US 9,035,639 B2
(45) Date of Patent: May 19, 2015

(54) VOLTAGE-TO-CURRENT SENSING CIRCUIT AND RELATED DC-DC CONVERTER

(71) Applicant: STMicroelectronics Design and Application S.R.O., Prague (CZ)

(72) Inventor: Martin Drinovsky, Horomerice (CZ)

(73) Assignee: STMICROELECTRONICS DESIGN AND APPLICATION S.R.O., Prague (CZ)

( * ) Notice: Subject to any disclaimer, the term of this patent is extended or adjusted under 35 U.S.C. 154(b) by 40 days.

(21) Appl. No.: 13/711,454

(22) Filed: Dec. 11, 2012

(65) Prior Publication Data

US 2013/0154595 A1    Jun. 20, 2013

(30) Foreign Application Priority Data

Dec. 15, 2011  (IT) ............................... MI2011A2268

(51) Int. Cl.
  G05F 1/00 (2006.01)
  G05F 1/46 (2006.01)
  G05F 1/56 (2006.01)
  H02M 3/156 (2006.01)
  H02M 1/00 (2006.01)

(52) U.S. Cl.
  CPC ...... *G05F 1/46* (2013.01); *G05F 1/561* (2013.01); *H02M 3/156* (2013.01); *H02M 2001/0009* (2013.01)

(58) Field of Classification Search
  CPC .............. H02M 3/156; H02M 3/1584; H02M 3/33507; H02M 2001/0032; H02M 2001/0009; Y02B 70/1466
  USPC ......................................... 323/282, 284, 285
  See application file for complete search history.

(56) References Cited

U.S. PATENT DOCUMENTS

| | | | |
|---|---|---|---|
| 5,258,653 A | 11/1993 | Perry | |
| 5,514,947 A * | 5/1996 | Berg | 323/282 |
| 5,757,174 A | 5/1998 | Ki | |
| 6,249,112 B1 * | 6/2001 | Khouri et al. | 323/282 |
| 7,116,088 B2 * | 10/2006 | Tran et al. | 323/282 |
| 7,990,222 B2 * | 8/2011 | Wang | 330/301 |

(Continued)

OTHER PUBLICATIONS

Herzer et al., "Capacitive-coupled Current Sensing and Auto-ranging Slope Compensation for Current Mode SMPS with Wide Supply and Frequency Range," in *Proceedings of ESSCIRC*, Sep. 14-18, 2009, pp. 140-143.

*Primary Examiner* — Matthew Nguyen
*Assistant Examiner* — Kevin H Sprenger
(74) *Attorney, Agent, or Firm* — Seed IP Law Group PLLC (57) ABSTRACT

The present disclosure is directed to a voltage-to-current sensing circuit having a bias terminal configured to receive a reference voltage, an offset terminal configured to receive an offset current, and an operational amplifier configured to output a low voltage signal. The device includes a first amplifier having first and second high voltage inputs configured to receive a first voltage difference across a sense component on a high voltage line and to generate a first current, a second amplifier having first and second low voltage inputs configured to receive a second voltage difference between the bias terminal and the offset terminal and to generate a second current, a summing circuit configured to provide an intermediate voltage corresponding to a sum of the first and the second currents, and a low-voltage transistor coupled to an output of the amplifier and controlled by the intermediate voltage to generate the output current.

15 Claims, 9 Drawing Sheets

(56) References Cited

U.S. PATENT DOCUMENTS

| | | |
|---|---|---|
| 8,203,323 B2 | 6/2012 | Wicht et al. |
| 8,525,505 B2 * | 9/2013 | Wang et al. ................... 323/286 |
| 2005/0001597 A1 | 1/2005 | Walters et al. |
| 2005/0285580 A1 | 12/2005 | Chen et al. |
| 2008/0218142 A1 | 9/2008 | Uehara |
| 2009/0153119 A1 * | 6/2009 | Trochut et al. ................ 323/282 |
| 2013/0063113 A1 * | 3/2013 | Couleur et al. ............... 323/282 |

* cited by examiner

VOLTAGE-TO-CURRENT SENSING CIRCUIT AND RELATED DC-DC CONVERTER

BACKGROUND

1. Technical Field

This disclosure relates to voltage-to-current sensing circuits and more particularly to an architecture of voltage-to-current sensing circuit with a reduced number of high voltage components, and to a multi-phase DC-DC converter having a plurality of voltage-to-current sensing circuits sharing a common bias terminal.

2. Description of the Related Art

Figure 1A:
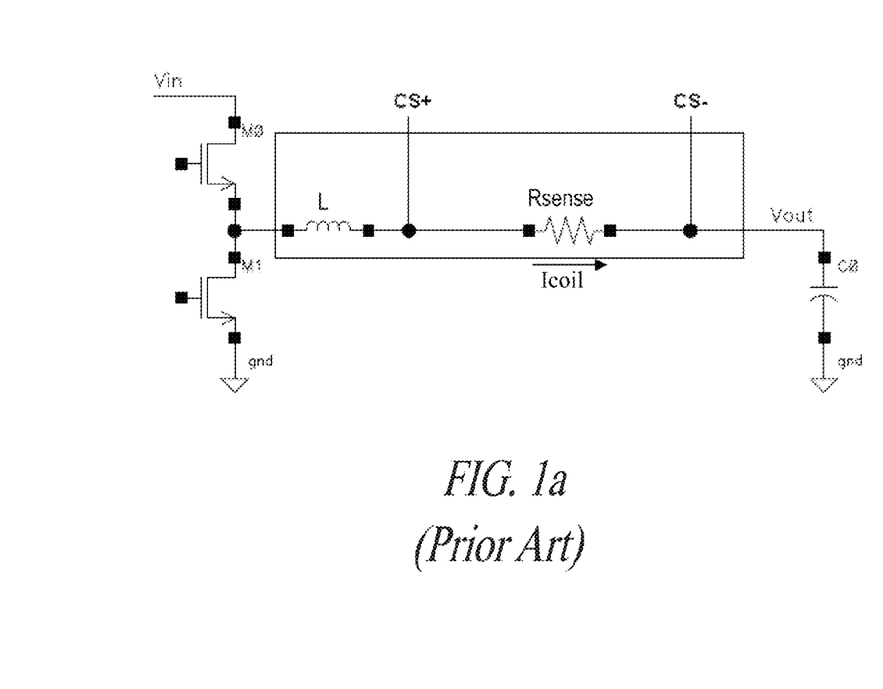
FIG. 1a depicts a switching stage driving a winding connected in series with a sense resistance Rsense.

In single-phase or multi-phase DC-DC switching voltage converters the current flowing throughout each phase winding is sensed in order to properly drive the converter. The current flowing throughout the phase windings is sensed by inserting a sense resistance Rsense in series with the winding (FIG. 1a), or exploiting the DC resistance of the winding, or by coupling the phase winding with a R-C line (FIG. 1b), wherein the sense capacitor Cdcr withstands the DC component of the voltage drop on the phase winding, then by sensing the voltage drop on the sensing terminals CS+, CS−.

Figure 2:
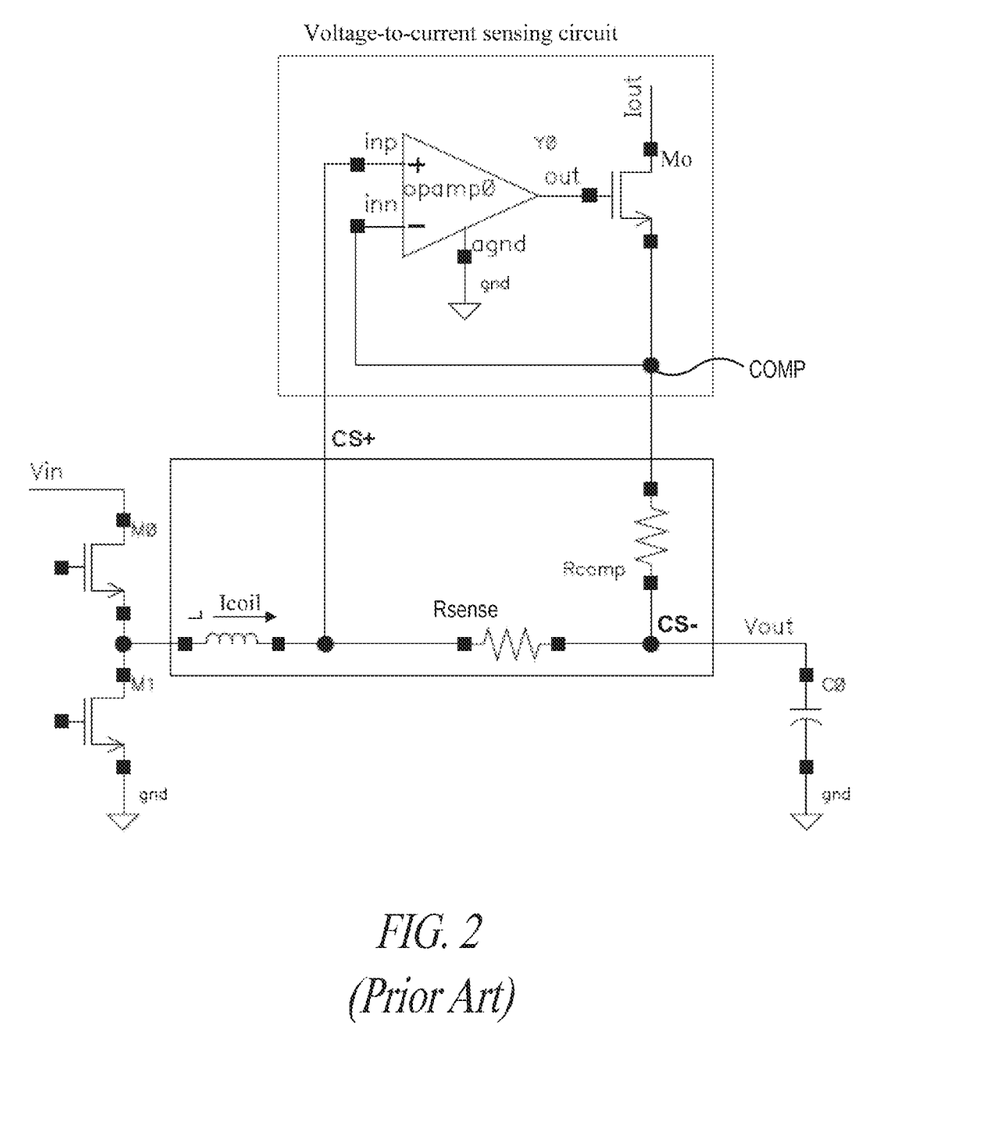
FIG. 2 depicts a known voltage-to-current sensing circuit connected to a series sense resistance Rsense.

A commonly used current sensor is shown in FIG. 2. It substantially comprises an operational amplifier opamp0 that controls an output transistor Mo such to make the voltage on the terminal COMP substantially equal to the voltage on the terminal CS+ by forcing a sense current Iout throughout the comparison resistor Rcomp. In steady-state conditions, the sense current Iout is:

$$I_{out} = I_{coil} \cdot \frac{R_{sense}}{R_{comp}} \quad (1)$$

and may be easily mirrored and distributed to circuits that drive the phase winding. The comparison resistor Rcomp may be a discrete component installed on a printed circuit board or be integrated in the chip that contains the DC-DC voltage converter.

Figure 1B:
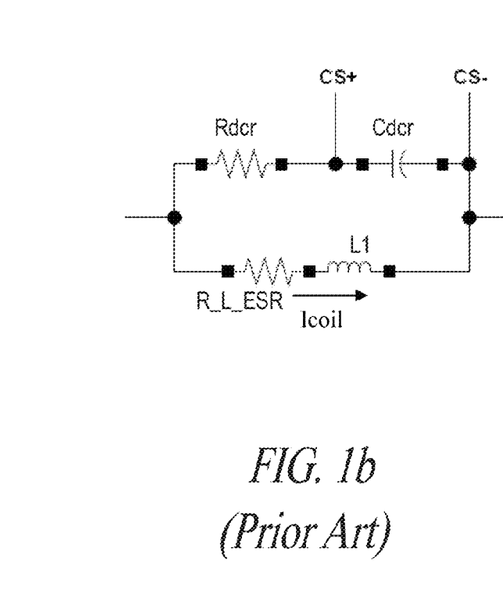
FIG. 1b depicts a switching stage driving a winding connected in parallel with a R-C line for sensing the DC voltage on the winding.

A main drawback of this type of sensing circuit consists in that the regulated voltage Vout, output by the DC-DC converter, may be relatively high, that is it may exceed the maximum voltage that common low voltage components may safely withstand. Therefore, in order to make the above prior circuit capable of sensing a current flowing in a line at a relatively high voltage, the transistor Mo and thus the whole operational amplifier OPAMP0 is made of high voltage components. The same conclusions would be attained if a matched R-C line as shown in FIG. 1b was used instead of a sense resistor Rsense connected in series with the phase winding.

High voltage components are area consuming and due to large parasitics they are inherently slower than the low voltage components and require large driving currents. For these reasons it is desirable to reduce the number of high voltage components as much as possible in the design of voltage-to-current sensing circuits.

Figure 3:
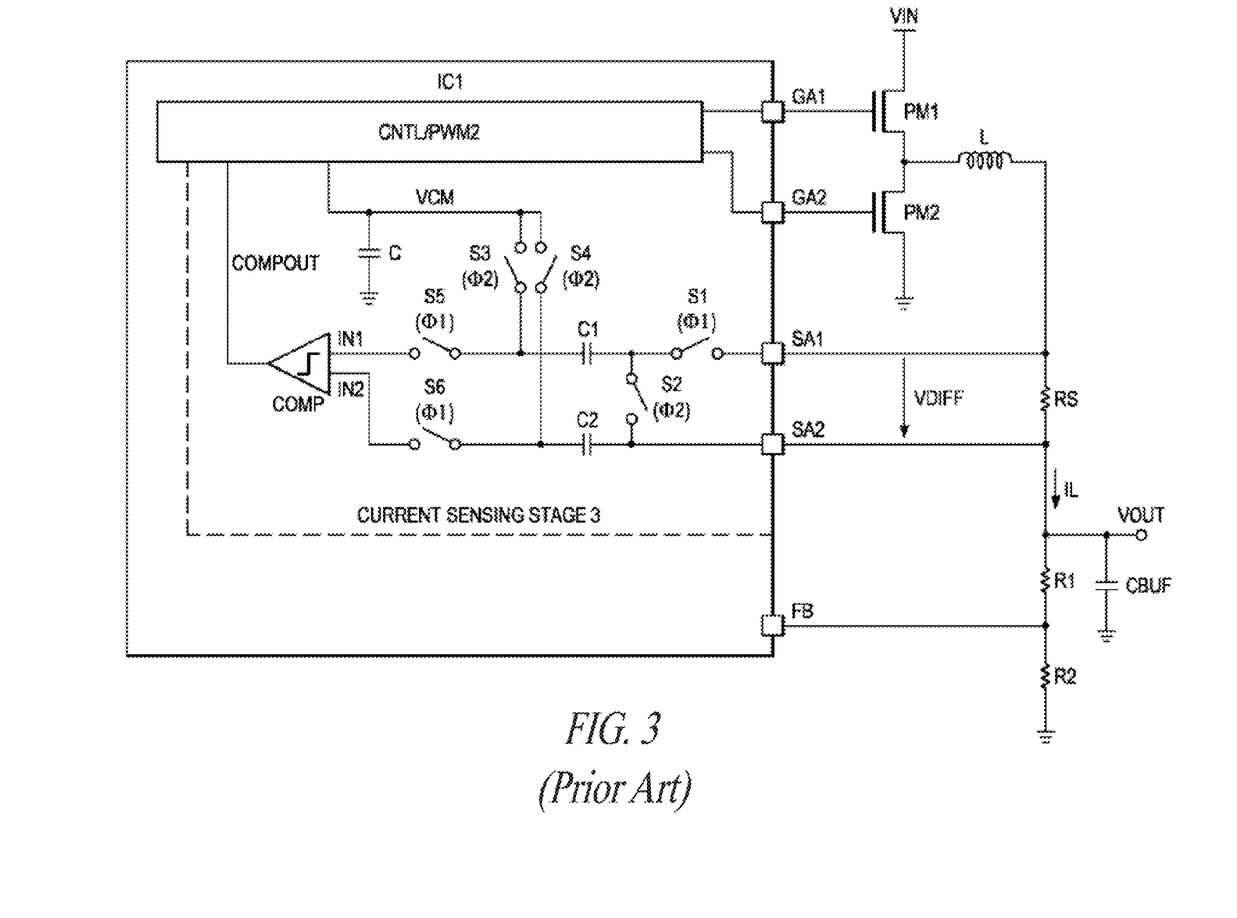
FIG. 3 depicts a known voltage-to-current sensing circuit.
Figure 4:
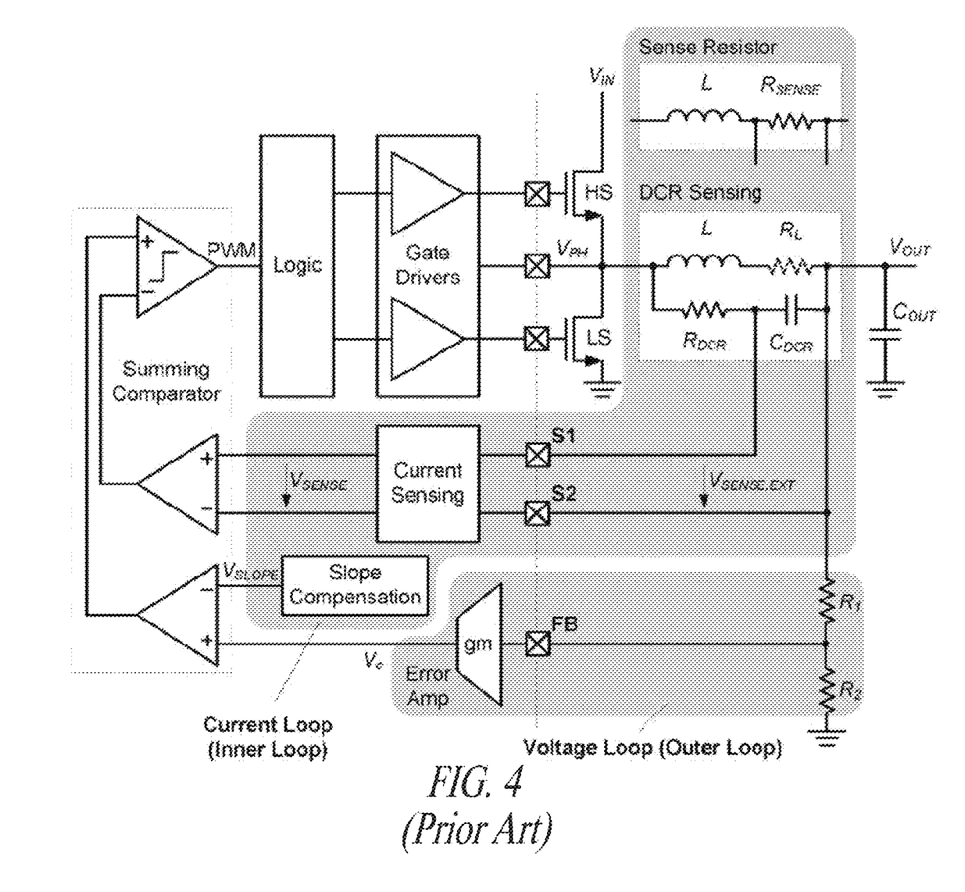
FIG. 4 depicts another known voltage-to-current sensing circuit.

Other prior voltage-to-current sensing circuits are disclosed in U.S. Pat. No. 8,203,323 in the name of Texas Instruments Inc. and in the article by S. Herzer et al. "Capacitive-coupled current sensing and auto-ranging slope compensation for current mode SMPS with wide supply and frequency range", Proceedings of ESSCIRC 2009, 14-18 Sep. 2009, pages 140-143, and are depicted in FIGS. 3 and 4, respectively. Both these prior circuits utilize high voltage switched capacitors, that are area consuming and slow down the transients of the prior voltage-to-current sensing circuits.

Figure 5:
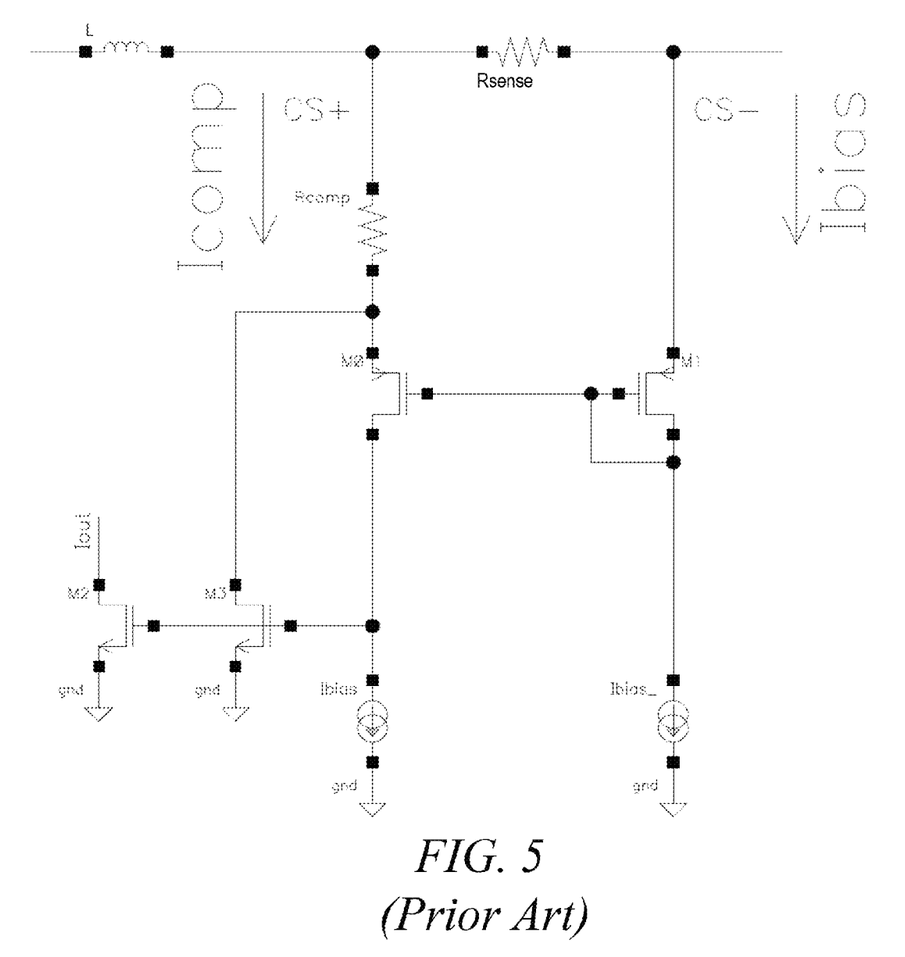
FIG. 5 is a high-level scheme of yet another known voltage-to-current sensing circuit.

A high-level scheme of another prior voltage-to-current sensing circuit is shown in FIG. 5. The difference current between the current Icomp, flowing throughout the comparison resistor Rcomp, and the bias current Ibias is forced throughout the transistor M3. The output transistor M2 is matched with the transistor M3, is referred to ground as the transistor M3 and is controlled by the same control voltage, thus the output current Iout is substantially a replica of the current Icomp−Ibias.

This circuit draws a relevant comparison current Icomp from the phase line and cannot be used when the current flowing through the phase winding L is sensed using a sense capacitor Cdcr connected as shown in FIG. 1b.

BRIEF SUMMARY

The applicants have found a convenient architecture for generating on a low-voltage line a current representative of the voltage drop on a sense component connected in a high-voltage line, using a reduced number of high-voltage components.

This result is obtained with a voltage-to-current sensing circuit having a four-input differential operational amplifier, comprising a high-voltage input transconductance amplifier that receives a sensed voltage and is adapted to generate a corresponding first current, a low-voltage input transconductance amplifier that receives a comparison voltage and is adapted to generate a corresponding second current, and circuit means connected in cascade to the high-voltage and low-voltage input transconductance amplifiers to generate an intermediate voltage corresponding to the sum of the first and second currents. The current representing the sensed voltage is generated by a low-voltage transistor, connected to the four-input differential operational amplifier such to be controlled by the intermediate voltage, and kept in a conduction state by an offset current generator. The comparison voltage is produced on a comparison resistor coupled between a bias terminal of the sensing circuit kept at a reference voltage and a current node of the low-voltage transistor.

According to an exemplary embodiment, the circuit means are a low-voltage output transconductance amplifier connected in cascade to the high-voltage and low-voltage input transconductance amplifiers.

The voltage-to-current sensing circuit may be used for example in single-phase or multi-phase DC-DC converters, in order to generate a current on a low-voltage line representative of the current flowing throughout the phase windings of the converter.

DETAILED DESCRIPTION

Figure 6:
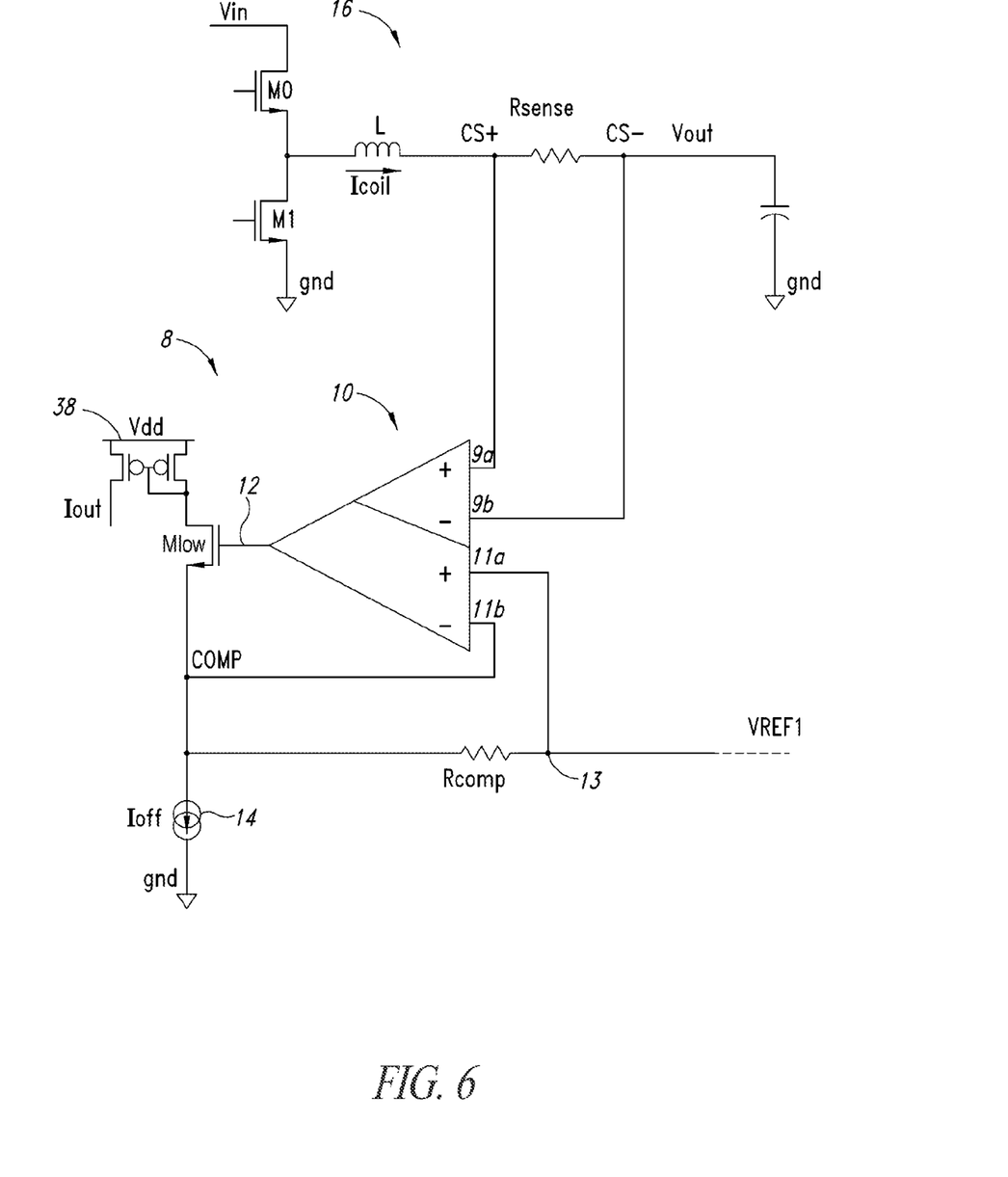
FIG. 6 depicts an embodiment of a voltage-to-current sensing circuit connected to the series resistance of a winding driven by a switching power stage.

A block diagram of an embodiment of the herein proposed voltage-to-current sensing circuit 8, coupled to a sense resistance Rsense of a phase winding L of a DC-DC converter 16, is shown in FIG. 6. It comprises a four-input differential operational amplifier 10 having high voltage 9a, 9b and low voltage input stages 11a, 11b, and a low voltage output stage 12 that controls a low voltage output transistor-$M_{low}$.

For sake of example, in the ensuing description, reference will be made to the case in which the phase current is sensed using a series resistance Rsense, though the same considerations could be done mutatis mutandis in case an R-C line is used according to the circuit shown in FIG. 1b.

The four-input differential operational amplifier 10 is made such to apply on the comparison resistor Rcomp a replica by a factor k of the voltage sensed on the sensing terminals CS−, CS+, thus the current Icomp flowing throughout the comparison resistor Rcomp is:

$$I_{comp} = I_{coil} \cdot \frac{R_{sense}}{R_{comp}} \cdot k$$

being Icoil the phase current to be sensed.

The output transistor $M_{low}$ is controlled by the operational amplifier 10 to be in a conduction state and be crossed by the difference between the current Icomp flowing through the comparison resistor Rcomp and an offset current Ioff fixed by a current generator 14. Such a difference current may be mirrored, as shown in FIG. 6, to generate a sense current Iout to be distributed outside the voltage-to-current sensing circuit 8. A reference voltage generator 18 provides a reference voltage VREF1 on a terminal 13 of the comparison resistance Rcomp and allows circulation of a current through it.

The offset current Ioff allows to keep in a conduction state the output transistor $M_{low}$ even when the phase current is negative, thus allowing to sense the current flowing in both directions.

Figure 7:
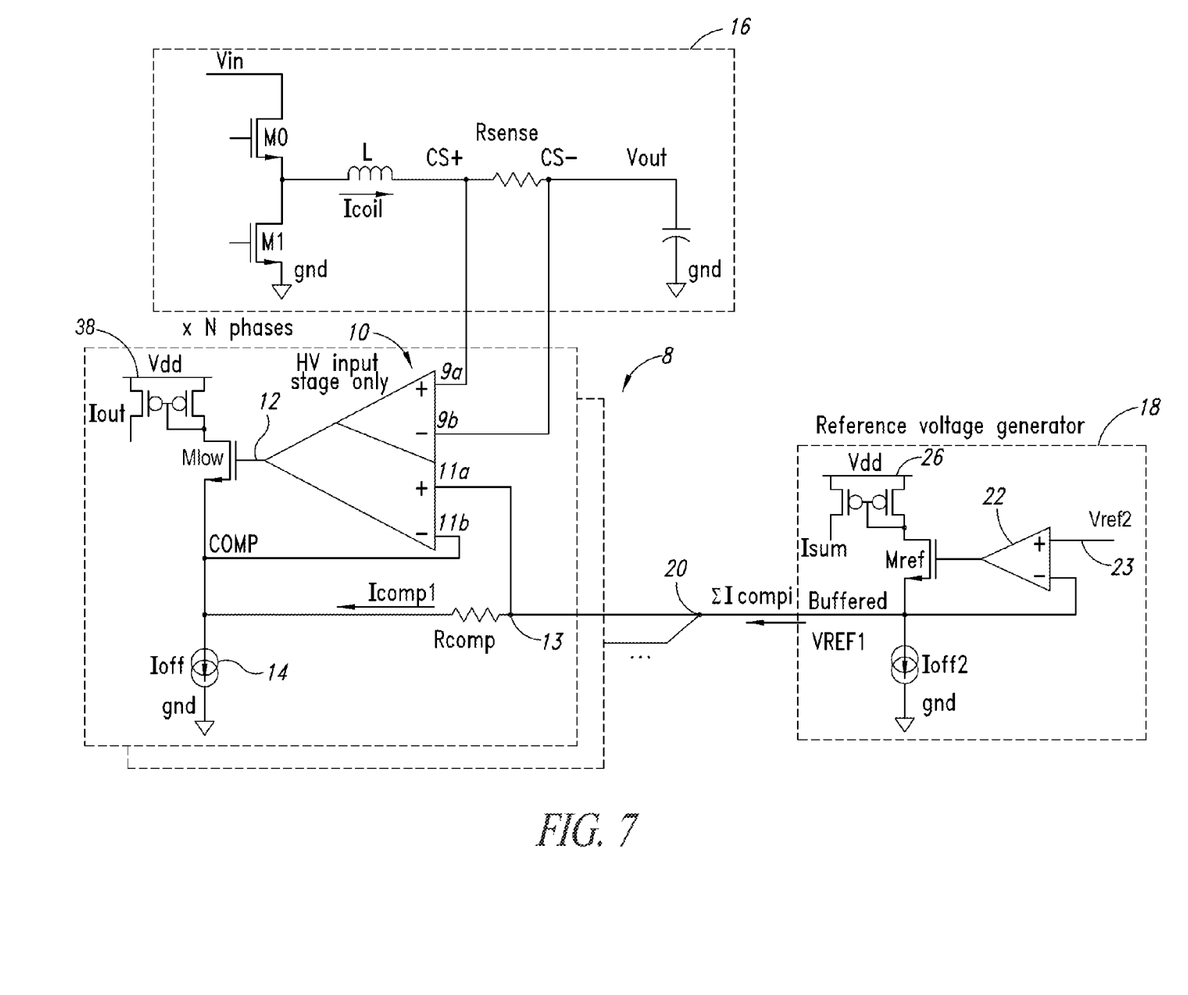
FIG. 7 illustrates how to connect among them a plurality of novel voltage-to-current sensing circuits each coupled to a respective phase winding of a DC-DC converter.

The voltage-to-current sensing circuit 8 of FIG. 6 may be replicated for sensing the current of each phase winding of a multi-phase DC-DC converter 16, as schematically depicted in FIG. 7. The voltage-to-current sensing circuits 8 have the same architecture, and all comparison resistances Rcomp share a common terminal 20, connected at the output of the shown reference voltage generator 18. The reference voltage generator 18 may be substantially composed of an operational amplifier 22 having an input 23 with a reference voltage Vref2, that may be for example the voltage generated by a band-gap voltage generator, that keeps a transistor Mref in a conduction state such to force through a current mirror 26 the difference between the sum of the currents flowing through the comparison resistances Rcomp and an offset current Ioff2. The current Isum delivered by the current mirror 26 represents the overall current delivered by the multi-phase DC-DC converter.

Figure 8:
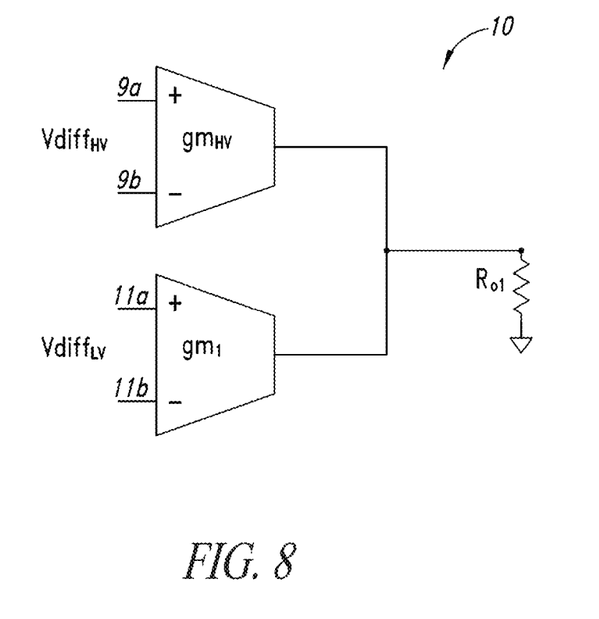
FIG. 8 illustrates an embodiment of the four-input differential operational amplifier of FIGS. 6 and 7.

An embodiment of a possible architecture of the four input differential operational amplifier 10 is shown in FIG. 8. It substantially comprises a high voltage input transconductance stage $g_{mHV}$, having inputs 9a, 9b, adapted to receive the voltage drop $Vdiff_{HV}$ on the sensing resistance Rsense, a low voltage input transconductance stage $g_{m1}$, having inputs 11a, 11b, which may be coupled to the comparison resistance Rcomp. A summing small-signal resistance Ro1 on which a voltage corresponding to the sum of the currents delivered by the low-voltage 11a, 11b and high-voltage 9a, 9b transconductance stages is made available. In the shown embodiment, the voltage on the resistance Ro1 is the control voltage of the transistor $M_{low}$ of the voltage-to-current sensing circuit 8. The architecture of FIG. 8 along with the feedback in FIG. 6 acts such to make the voltage $V_{diffLV}$ equal to a scaled replica of the voltage $V_{diffHV}$ according to the following equation:

$$V_{diffLV} = V_{diffHV} \cdot \frac{g_{mHV}}{g_{m1}}$$

thus the current flowing through the resistance Rcomp is $$I_{comp} = I_{coil} \cdot \frac{R_{sense}}{R_{comp}} \cdot \frac{g_{mHV}}{g_{m1}} \quad (3)$$

According to an embodiment, the two transconductance stages are matched to each other, i.e., $g_{mHV} = g_{m1}$, such that:

$$V_{diffLV} = V_{diffHV}$$

Figure 9:
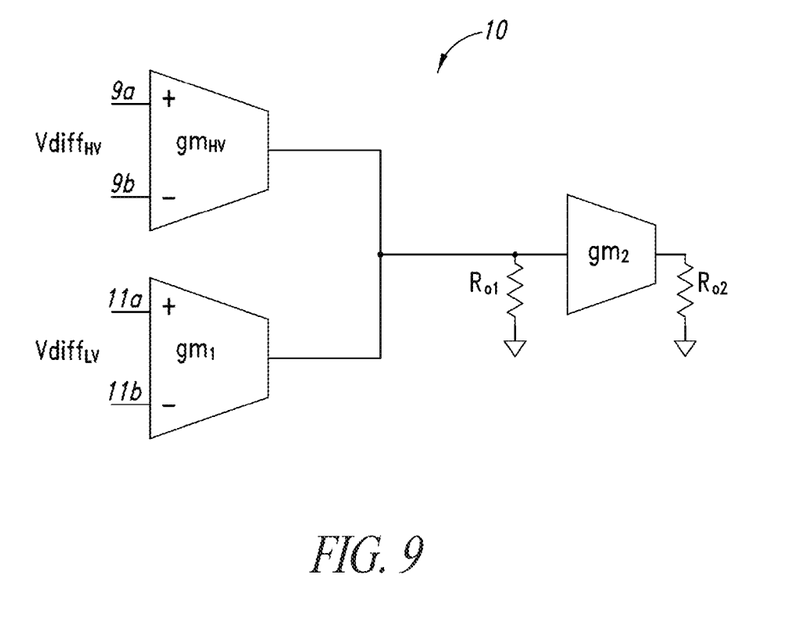
FIG. 9 illustrates another embodiment of the four-input differential operational amplifier of FIGS. 6 and 7.

According to another embodiment shown in FIG. 9, the four-input differential amplifier comprises a low voltage output transconductance stage $g_{m2}$, Ro1, Ro2 that generates the control voltage of the transistor $M_{low}$ of the voltage-to-current sensing circuit 8. The current mirror 38 is coupled the transistor $M_{low}$ and outputs the output current Iout.

Other embodiments of the four-input differential amplifier with two or more output stages are possible. They may be easily realized by the skilled person starting from the above observations and using common knowledge in the art, and for this reason they are not shown in the figures and will not be discussed further.

The comparison resistance Rcomp suffers from large technological spread and this may lead to inaccurate sensing of the phase current Icoil. In order to compensate technological spread and have a sense current Icomp that substantially replicates the phase current Icoil, it is possible to adjust accordingly the bias current of the high voltage input transconductance stage, i.e., by adjusting the transconductance value $gm_{HV}$ through varying its tail current.

With the proposed architectures of voltage-to-current sensing circuit 8, there is only a high voltage input stage, the remaining stage(s) and the output transistor $M_{low}$ being made of low voltage components, thus saving a relevant amount of silicon area.

Figures 10A, 10B:
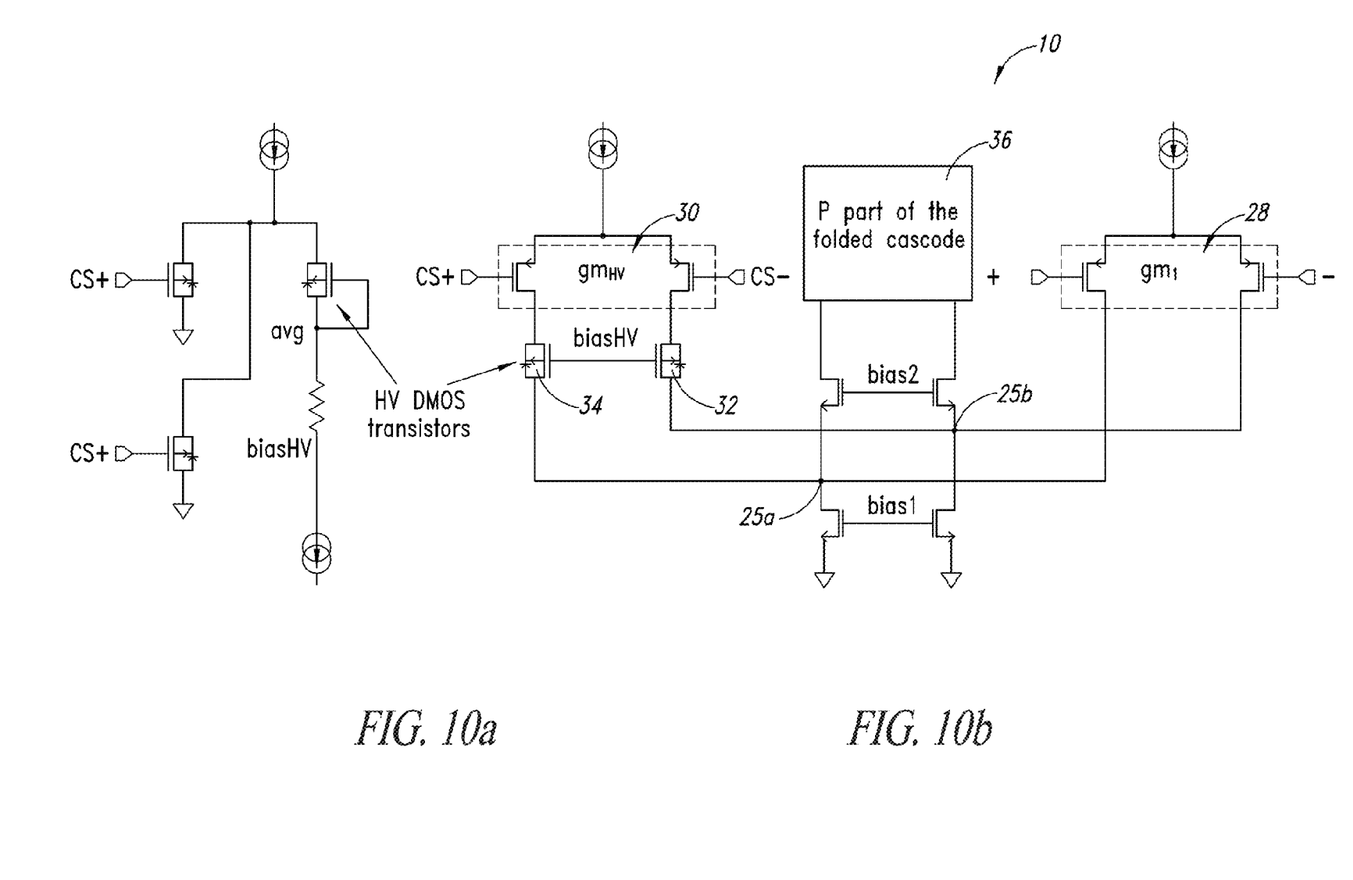
FIGS. 10a and 10b are more detailed circuit architectures of the low-voltage and high-voltage input stages of the four-input differential operational amplifier of FIGS. 6 and 7.

An exemplary embodiment of the low-voltage and high-voltage input stages $gm_1$, $gm_{HV}$ and of the summing nodes 25a, 25b of the four-input differential operational amplifier 10 is schematically depicted in FIGS. 10a and 10b. The two parallel input transistor pairs 28 and 30 of FIG. 10b are made of low voltage transistors, for obtaining a good matching. In order to be able to sustain high voltages, the input pair corresponding to the high voltage transconductance stage $gm_{HV}$ is cascoded using high voltage DMOS transistors 32, 34, the bias voltage of which tracks the input voltage using the circuit depicted in FIG. 10a. The differential current signals from the two differential stages are summed using a folded cascode 36, according to a common practice, but any other summing scheme can be used. In cascade to the folded cascode, several gain stages (not shown) can be added to improve the performance of the operational amplifier 10.

The voltage-to-current sensing circuit 8 may be used to sense a current flowing throughout a sense resistance connected on a relatively high voltage line. Particularly, though not exclusively, the proposed current sensing device may be used in single-phase or multi-phase DC-DC converters to sense phase currents.

The proposed solution uses a reduced number of high voltage components, thus a relevant amount of silicon area is saved, because high voltage components are formed to have large well pockets to be able to sustain high voltages. These large pockets of the high voltage components also have great parasitic capacitances, thus limiting speed/power ratio. This disadvantage of the traditional approach is even worsened by the fact that the feedback loop runs through the high voltage components.

By contrast, in the proposed architecture, the feedback loop runs through the low voltage components only, thus using the current sensing device it is possible to realize faster DC-DC converter with reduced current consumption.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
  a voltage-to-current sensing circuit configured to generate an output current on a low-voltage line corresponding to a sense voltage on a high-voltage line, the sensing circuit having a bias terminal configured to receive a reference voltage, the sensing circuit including:
    a four-input differential operational amplifier, including:
      a low voltage output terminal;
      a high-voltage input transconductance amplifier configured to receive the sense voltage and configured to generate a corresponding first current;
      a low-voltage input transconductance amplifier configured to receive a comparison voltage and configured to generate a corresponding second current;
      a summing circuit electrically coupled in cascade to said high-voltage and low-voltage input transconductance amplifiers and configured to generate an intermediate voltage corresponding to a sum of said first current and said second current;
    a low-voltage transistor electrically coupled to the low voltage output terminal of said four-input differential operational amplifier, the low voltage transistor being configured to be controlled by said intermediate voltage, and being configured to generate said output current;
    a comparison resistor configured to provide the comparison voltage, the comparison resistor being connected to the bias terminal of the sensing circuit, connected to a first terminal of said low-voltage transistor, the first terminal of the low-voltage transistor being connected to a non-inverting input of the low voltage input transconductance amplifier; and
    an offset current generator coupled to said first terminal and configured to keep said low-voltage transistor in a conduction state when said sense voltage is null.

2. The device of claim 1 wherein the low-voltage transistor has a second terminal and a current mirror is coupled to the second terminal of the low-voltage transistor and configured to generate a replica of said output current.

3. The device of claim 1, further comprising a generator configured to generate said reference voltage on said bias terminal of the sensing circuit.

4. The device of claim 1 wherein said summing circuit includes a low-voltage output transconductance amplifier coupled in cascade to said high-voltage and low-voltage input transconductance amplifiers, the low-voltage output transconductance amplifier being configured to generate the intermediate voltage corresponding to the sum of the first and second currents.

5. A device, comprising:
  a single-phase DC-DC converter that includes:
    a sense component;
    a phase winding electrically coupled to the sense component, a voltage drop across the sense component being configured to represent a current flowing through the phase winding;
  a voltage-to-current sensing circuit coupled to said sense component, the sensing circuit being configured to generate, on a low-voltage line, an output current that is configured to represent the current flowing through said phase winding, the sensing circuit including
    a bias terminal configured to receive a reference voltage;
    a four-input differential operational amplifier having a low voltage output, including:
      a high-voltage input transconductance amplifier configured to receive a sense voltage from the sense component and configured to generate a corresponding first current;
      a low-voltage input transconductance amplifier having a first input and a second input, the first input configured to receive a comparison voltage and the second input corresponding to the bias terminal and being configured to receive the reference voltage and the low-voltage input transconductance amplifier being configured to generate a corresponding second current;
      summing circuit coupled in cascade to said high-voltage and low-voltage input transconductance amplifiers to generate an intermediate voltage corresponding to a sum of said first current and said second current;
    a low-voltage transistor coupled to the low voltage output of said four-input differential operational amplifier, the low voltage transistor being configured to be controlled by said intermediate voltage, and being configured to generate said output current;
    a comparison resistor configured to provide the comparison voltage on the first input, the comparison resistor being connected to the first input and the second input of the low-voltage input transconductance amplifier and the comparison resistor being connected to a first terminal of said low-voltage transistor; and an offset current generator coupled to said first terminal and configured to keep said low-voltage transistor in a conduction state when said sense voltage is null.

6. The device of claim 5 wherein the low-voltage transistor has a second terminal and a current mirror is coupled to the second terminal of the low-voltage transistor to generate a replica of said output current.

7. The device of claim 5, further comprising a generator configured to generate said reference voltage on said bias terminal of the sensing circuit.

8. The device of claim 5 wherein said summing circuit includes a low-voltage output transconductance amplifier coupled in cascade to said high-voltage and low-voltage input transconductance amplifiers, the low-voltage output transconductance amplifier being configured to generate the intermediate voltage corresponding to the sum of the first and second currents.

9. A device, comprising:
a multi-phase DC-DC converter, including:
    a plurality of sense components;
    a plurality of phase windings each coupled to a corresponding one of the sense components, each sense component being configured to provide a voltage drop corresponding to a current flowing through the corresponding phase winding;
    a plurality of voltage-to-current sensing circuits each coupled to a corresponding one of the plurality of sense components, each sensing circuit being configured to generate an output current that represents the current flowing through said corresponding phase winding, each of the sensing circuits having a bias terminal, each of the bias terminals being coupled together, each sensing circuit including:
        a four-input differential operational amplifier having a low voltage output, including:
            a high-voltage input transconductance amplifier configured to receive a sense voltage across the associated sense component, and configured to generate a first current;
            a low-voltage input transconductance amplifier configured to receive a comparison voltage on a first input, a second input is coupled to the bias terminal, and low-voltage input transconductance amplifier is configured to generate a second current;
            a summing circuit coupled in cascade to said high-voltage and low-voltage input transconductance amplifiers to generate an intermediate voltage corresponding to a sum of said first current and said second current;
        a low-voltage transistor coupled to the low voltage output of said four-input differential operational amplifier, the low voltage transistor being configured to be controlled by said intermediate voltage, and being configured to generate said output current;
        a comparison resistor configured to provide the comparison voltage to the first input, the comparison resistor being connected to the bias terminal of the sensing circuit, connected to the first input, and connected to a first terminal of said low-voltage transistor; and
        an offset current generator coupled to said first terminal and configured to keep said low-voltage transistor in a conduction state when said sense voltage is null.

10. The device of claim 9 wherein the low-voltage transistor has a second terminal and a current mirror is coupled to the second terminal of the low-voltage transistor to generate a replica of said output current.

11. The device of claim 9, further comprising a generator configured to generate said reference voltage on said bias terminal of the sensing circuit.

12. The device of claim 9 wherein said summing circuit includes a low-voltage output transconductance amplifier coupled in cascade to said high-voltage and low-voltage input transconductance amplifiers, the low-voltage output transconductance amplifier being configured to generate the intermediate voltage corresponding to the sum of the first and second currents.

13. A device, comprising:
a voltage-to-current sensing circuit, the sensing circuit including:
    a bias terminal configured to receive a reference voltage;
    an offset terminal configured to receive an offset current;
    an operational amplifier configured to output a low voltage signal, the operational amplifier including:
        a first amplifier having first and second high voltage inputs that are configured to receive a first voltage difference across a sense component on a high voltage line, the first amplifier being configured to generate a first current;
        a second amplifier having first and second low voltage inputs that are configured to receive a second voltage difference between the bias terminal and the offset terminal, the second amplifier being configured to generate a second current;
        a summing circuit configured to provide an intermediate voltage corresponding to a sum of the first and the second currents; and
    a low-voltage transistor coupled to an output of the operational amplifier, the low voltage transistor being configured to be controlled by the intermediate voltage, and being configured to generate the output current; and
    a comparison resistor connected to the first low voltage input, connected to the second low voltage input, and connected to a first input of the low voltage transistor.

14. The device of claim 13, further comprising a current mirror coupled to the low-voltage transistor and configured to output the output current.

15. The device of claim 13, further comprising a reference voltage generator coupled to the bias terminal and configured to provide a reference voltage from a reference signal.

* * * * *